United States Patent [19]
Nakagawa et al.

[11] B 3,991,725
[45] Nov. 16, 1976

[54] INTERNAL COMBUSTION ENGINE HAVING AUXILIARY COMBUSTION CHAMBERS

[75] Inventors: Yasuhiko Nakagawa, Fujisawa; Katsunori Terasaka, Yokohama; Susumu Kimura; Masanobu Yoshioka, both of Yososuka, all of Japan

[73] Assignee: Nissan Motor Company Limited, Yokohama, Japan

[22] Filed: May 6, 1974

[21] Appl. No.: 467,486

[44] Published under the second Trial Voluntary Protest Program on March 16, 1976 as document No. B 467,486.

[30] Foreign Application Priority Data

May 8, 1973 Japan................ 48-50942
May 8, 1973 Japan................ 48-50943
May 8, 1973 Japan................ 48-50944

[52] U.S. Cl................ 123/32 SP; 123/32 ST; 123/90.15
[51] Int. Cl.² ................ F01L 1/34
[58] Field of Search............ 123/32 ST, 32 SP, 75 B, 123/191 S, 191 SP, 90.15

[56] References Cited
UNITED STATES PATENTS

| | | |
|---|---|---|
| 2,011,992 | 8/1935 | Aseltine................ 123/32 SP |
| 2,110,191 | 3/1938 | Bagnulo................ 123/32 SP |
| 2,770,224 | 11/1956 | Ericson................ 123/90.15 |
| 3,234,923 | 2/1966 | Fleck................ 123/90.15 |
| 3,763,834 | 10/1973 | Geiger................ 123/32 SP |
| R26,603 | 6/1969 | Von Seggern................ 123/32 ST |

*Primary Examiner*—Charles J. Myhre
*Assistant Examiner*—Daniel J. O'Connor

[57] ABSTRACT

Improvements are made in a reciprocating-piston, four-stroke spark-ignition internal combustion engine of the type which has main and auxiliary combustion chambers and main and auxiliary intake valve associated respectively with the combustion chambers, wherein the auxiliary intake valve has a valve lift smaller than a valve lift of the main intake valve and wherein the duration of opening of the auxiliary intake valve is arranged to be shorter than that of the main intake valve for each of the intake strokes of the engine. The auxiliary intake stroke is preferably so operated as to start to open after the main intake valve has been opened and to fully close simultaneously as or before the main intake valve is fully closed. The improvements are intended to prevent escape of an air-fuel mixture from the auxiliary combustion chamber into the main combustion chamber during intake strokes of the engine so that the ratio between the volumes of the air-fuel mixtures in the two combustion chambers is maintained constant under varying operational conditions of the engine.

12 Claims, 4 Drawing Figures

INTERNAL COMBUSTION ENGINE HAVING AUXILIARY COMBUSTION CHAMBERS

The present invention relates generally to reciprocating-piston, four-cycle spark-ignition internal combustion engines and, particularly, to a reciprocating-piston, four-cycle spark-ignition internal combustion engine of the character which has main and auxiliary combustion chambers in each of cylinders. More specifically, the present invention is concerned with intake valves for the main and auxiliary combustion chambers of the internal combustion engine of the specified character, especially to timings at which the intake valves are opened and closed during successive strokes of the piston in the engine cylinder.

The internal combustion engine of the particular type has been developed with a view to minimizing toxic compounds, especially hydrocarbons and carbon monoxide in engine emissions through use of a leaned air-fuel mixture, viz., an air-fuel mixture having an increased air-to-fuel ratio. Thus, the main combustion chamber of each of the cylinders of such an internal combustion engine is supplied with a relatively lean air-fuel mixture whereas the auxiliary chamber is supplied with a richer air-fuel mixture during intake strokes of the engine. An ignition spark plug projects into the auxiliary combustion chamber and fires the relatively rich air-fuel mixture admitted into the chamber so that the relatively lean air-fuel mixture directed into the main combustion chamber is fired with the agency of the flames propagating from the auxiliary combustion or precombustion chamber.

To achieve a satisfactory combustion efficiency in the internal combustion engine of this type, it is important that the relative rich air-fuel mixture in the auxiliary combustion chamber is prevented from escaping in sizeable quantity into the main combustion chamber so that the ratio between volumes of the air-fuel mixtures in the two combustion chambers is maintained substantially constant throughout the intake stroke of the engine. Since, in this instance, the ratio of the volume of the air-fuel mixture supplied to the auxiliary combustion chamber to the volume of the air-fuel mixture supplied to the main combustion chamber is usually in a range of from about 1:20 to about 1:100, an extreme difficulty is encountered in maintaining such a ratio constant throughout the intake stroke of the engine. A tendency is consequently exhibited in which an unduly large amount of relatively rich air-fuel mixture is delivered to the auxiliary combustion chamber with the result that the air-fuel mixture in the main combustion chamber is objectionably enriched by the mixture flowing into the main combustion chamber from the auxiliary combustion chamber.

Such a problem would be to a certain extent solved the ratio in volume between the air-fuel mixtures fed to the main and auxiliary combustion chambers is controlled in accordance with appropriate schedules throughout varying operating conditions of the engine. The main and auxiliary combustion chambers are connected to carburetors which are designed to be respectively competent to the combustion conditions of the main and auxiliary combustion chambers. To control the ratio between the volumes of the air-fuel mixtures to be delivered to the main and auxiliary combustion chambers, therefore, suitable means may be provided which are adapted to interconnect throttle valves of the two carburetors for achieving a fixed ratio between degrees of opening of the throttle valves and, moreover, the intake valves associated with the main and auxiliary combustion chambers may be opened and closed at timings controlled in relation to degrees of angle of rotation of the crankshaft of the engine. A mixture intake arrangement has therefore been proposed by which the intake valve for the auxiliary combustion chamber is closed after the intake valve for the main combustion chamber has been closed and, in addition, both of the intake valves are kept open for the same durations. A drawback is, however, invited as a result of such an arrangement in that the burned gases in the auxiliary combustion chamber happen to flow backwardly past the intake valve and into the carburetor for the auxiliary combustion chamber when the engine is operating under relatively heavy load and yet at a relatively low speed of, for example, 1200 to 1600 rpm.

Admission of an increased amount of air-fuel mixture into the auxiliary combustion chamber would be prevented or alleviated if the auxiliary combustion chamber has an intake port of a reduced size. This is, however, actually impracticable because the diameter of the intake valve to fit such a port cannot be made smaller than 10 to 11 mm to maintain a necessary mechanical strength of the valve, as is well known in the art.

The internal combustion engines having the precombustion chambers are, for these reasons, not fully acceptable for achieving satisfactory combustion efficiencies and exhaust cleaning performances.

It is, therefore, an important object of the present invention to provide an improved internal combustion engine of the described type and yet capable of achieving a satisfactory combustion efficiency and an enhanced exhaust cleaning ability.

It is another important object of the invention to provide an improved internal combustion engine of the described type wherein the ratio in volume between the air-fuel mixtures delivered to the main and auxiliary combustion chambers is maintained substantially constant throughout varying operational conditions of the engine.

It is still another important object of the invention to provide an improved internal combustion engine of the described type in which the intake valves for the main and auxiliary combustion chambers of the engine cylinders are operated to open and close at timings which are controlled in relation to the degrees of crankshaft rotation so that the ratio between the volumes of the air-fuel mixture supplied to the main and auxiliary combustion chambers in each of the engine cylinders is maintained substantially constant throughout the intake strokes of the engine.

To accomplish these and other objects, the improvement according to the present invention comprises an arrangement in which the intake valve associated with the auxiliary combustion chamber has a valve lift smaller than that of the intake valve associated with the main combustion chamber and is operated to open for a shorter duration than the intake valve associated with the main combustion chamber. Preferably, the intake valve associated with the auxiliary combustion chamber is operated to open after the intake valve associated with the main combustion chamber is opened and to close earlier than the closing of the intake valve for the main combustion chamber. More preferably, the intake valve associated with the auxiliary combustion chamber is operated to close before the intake valve associated with the main combustion chamber is fully closed and after the bottom dead center of the piston on the compression stroke. In this instance, the intake valves for the main and auxiliary combustion chambers are preferably so operated that the intake valve associated with the auxiliary combustion chamber stay open for a duration longer than about 60 per cent of the duration of opening of the intake valve for the main combustion chamber. Thus, the intake valve associated with the main combustion chamber may be operated to open at a suitable number of degrees of crankshaft rotation before the top dead center of the piston on the exhaust stroke and to close at a suitable number of degrees of crankshaft rotation after the bottom dead center of the piston on the compression stroke. In this instance, the intake valve associated with the auxiliary combustion chamber is operated to open in the vicinity of the top dead center of the piston on the exhaust stroke and to close before the intake valve associated with the main combustion chamber is closed.

The features of the internal combustion engine according to the present invention will become more apparent from the following detailed description of the invention taken in conjunction with the accompanying drawings, in which.

Figure 1:
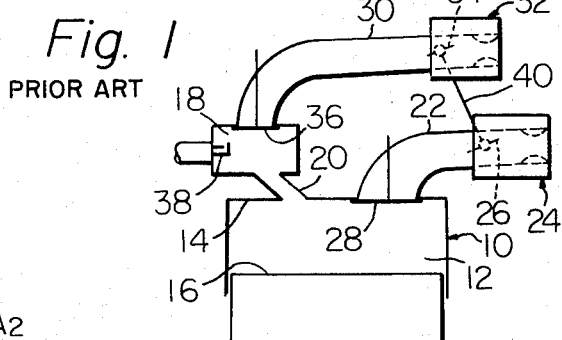
FIG. 1 is a schematic view which shows part of the internal combustion engine of the described type into which the improvements according to the present invention is to be incorporated.
Figure 3:
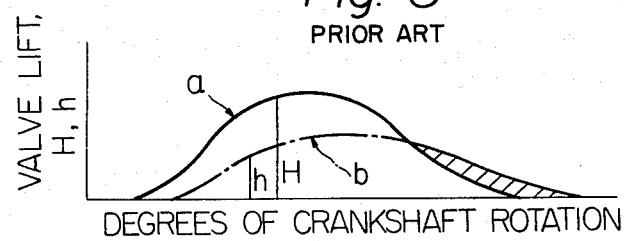
Figure 4:
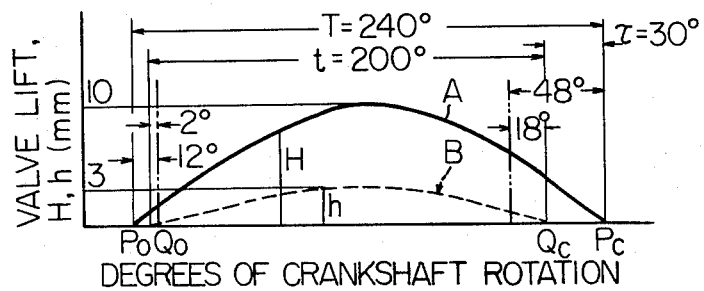

FIG. 3 is a graph which shows curves indicating relations between lifts of the intake valves for the main and auxiliary combustion chambers and degrees of angle of crankshaft rotation as obtained when the valves are open in the internal combustion engine of the type illustrated in FIG. 1; and FIG. 4 is a graph similar to FIG. 3 but shows curves which are obtained in the case of the internal combustion engine into which the improvements according to the present invention is incorporated.

Reference will now be made to the drawings, first to FIG. 1. The present invention is directed to an internal combustion engine which comprises a cylinder having a main combustion chamber 12 defined between a cylinder head 14 and the top of a reciprocating piston 16 and an auxiliary combustion or precombustion chamber 18 which is in communication with the main combustion chamber 12 through a flame passageway 20. The auxiliary combustion chamber 18 is usually formed in the cylinder head 14. The main combustion chamber 12 is connected through a main intake manifold 22 to a main carburetor 24 having a throttle valve 26 and a main intake valve 28 is located between the main combustion chamber 12 and an outlet port of the main intake manifold 22. Likewise, the auxiliary combustion chamber 18 is connected through an auxiliary intake manifold 30 to an auxiliary carburetor 32 having a throttle valve 34 and an auxiliary intake valve 36 is interposed between the auxiliary combustion chamber 18 and an outlet port of the auxiliary intake manifold 30. The main carburetor 24 is so arranged as to deliver a relatively lean air-fuel mixture to the main combustion chamber 12 whereas the auxiliary carburetor 32 is adapted to deliver a relatively rich air-fuel mixture to the auxiliary combustion chamber 18. Into the auxiliary combustion chamber 18 does project an ignition spark plug 38 to fire the air-fuel mixture admitted to the auxiliary combustion chamber 18. Designated by reference numeral 40 is a mechanical linkage which interconnects shafts carrying the throttle valves 26 and 34 of the main and auxiliary carburetors 24 and 32, respectively. The mechanical linkage 40 is connected to an accelerator pedal (not shown) of the vehicle so that the throttle valves 26 and 34 of the main and auxiliary carburetors 24 and 32 are moved to deliver air-fuel mixtures which are proportioned in volume to a substantially fixed ratio. The construction of the internal combustion engine above described is well known in the art and, as such, no further detailed description thereof will be herein made.

When, in operation, the main and auxiliary intake valves 28 and 36 are operated to open at controlled timings, the relatively lean and rich air-fuel mixtures are delivered from the main and auxiliary carburetors 24 and 32 at rates which are controlled by the throttle valves 26 and 34, respectively. The relatively rich air-fuel mixture thus admitted to the auxiliary combustion chamber 18 is fired at a controlled timing by means of the ignition spark plug 38 and the flames produced by the burned gases in the auxiliary combustion chamber 18 spurt through the flame passageway 20 into the main combustion chamber 12. The relatively lean air-fuel mixture which has been directed into the main combustion chamber 12 is consequently fired by the flames entering the main combustion chamber from the flame passageway 20 during the power stroke of the engine.

Figure 2:
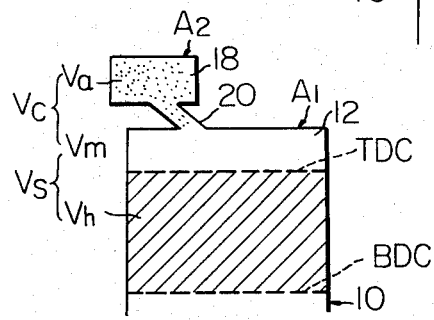
FIG. 2 is a schematic view which shows dimensional relation between the main and auxiliary combustion chambers of the internal combustion engine illustrated in FIG. 1.

If, now, the volumes of the air-fuel mixtures to be admitted into the main and auxiliary chambers 12 and 18 per intake stroke of the piston 16 are $A_1$ and $A_2$, then the following condition must be satisifed for the purpose of preventing the air-fuel mixture from escaping from the auxiliary combustion chamber 18 into the main combustion chamber 12:

$$0 < A_2/A_1 \leq Va/Vs, \qquad (1)$$

where $Va$ is the capacity of the auxiliary combustion chamber 18 and $Vs$ is a sum of the capacity $Vm$ of the main combustion chamber 12 provided by the piston 16 at the top dead center (TDC) and the volume $Vh$ of the displacement of the piston 16 between the top dead center and the bottom dead center (BTC), as schematically illustrated in FIG. 2. As also illustrated in FIG. 2, the clearance volume $Vc$ of the internal combustion engine of the type herein dealt with is defined as a sum of the capacity $Vm$ of the main combustion chamber 12 with the piston at the top dead center and the capacity $Va$ of the auxiliary combustion chamber 18 including the space forming the flame passageway 20. Hence, $$Vs = Va + Vm, \qquad (2)$$

$$Vc = Vm + Vh. \qquad (3)$$

If, thus, the ratio of the capacity $Va$ of the auxiliary combustion chamber 18 vs. the clearance volume $Vc$ is $\phi$, there will hold the following relations between the values of $Va$, $Vc$, $Vs$ and $Vh$:

$$Va = \phi Vc, \qquad (4)$$

$$V_s = V_c(1 - \phi) + V_h. \tag{5}$$

Substitution of these equations (4) and (5) into the relation (1) results in $$A_2/A_1 \leq \frac{\phi V_c}{V_c(1 - \phi) + V_h}$$

$$= \frac{\phi}{1 - \phi + V_h/V_c}. \tag{6}$$

If the compression ratio prescribed on the internal combustion engine under consideration is $\epsilon$, $$\epsilon = (V_h + V_c)/V_c = 1 + V_h/V_c,$$

so that the relation (6) can be rewritten $$A_2/A_1 \leq \phi/(\epsilon - \phi). \tag{7}$$

If, thus, the ratio $\phi$ is 0.1:1 and the compression ratio $\epsilon$ is 8.5:1 by way of example, then the ratio between the volumes of the air-fuel mixtures admitted to the main and auxiliary combustion chambers 12 and 18 is given in a range of $$A_2/A_1 \leq 1/84.$$

Since, however, certain allowance is actually provided to permit the air-fuel mixture to escape from the auxiliary combustion chamber 18 into the main combustion chamber 12 and if the effect of a differential temperature between the main and auxiliary combustion chambers 12 and 18, a suitable compensation factor $k$ should be incorporated into the relation (7) so that $$0 < A_2/A_1 \leq k \cdot \frac{\phi}{\epsilon - \phi} \tag{8}$$

The compensation factor $k$ is usually selected in such a manner to make the ratio $A_2/A_1$ range from about 1/20 to 1/100.

Difficulty is encountered in constantly maintaining the ratio $A_2/A_1$ at such an extremely small value throughout the varying operational conditions of the engine so that, in the prior art internal combustion engine of the described type, it has been unavoidable that the air-fuel mixture escapes in a sizeable quantity from the auxiliary combustion chamber 18 into the main combustion chamber 12.

To provide a solution to this problem, a certain advanced version of the prior art internal combustion engine having the described general construction is arranged so that the intake valves for the main and auxiliary combustion chambers are operated to open and close in accordance with schedules illustrated in FIG. 3, wherein the axis of abscissa stands for degrees of angle of crankshaft rotation and the axis of ordinate represents lifts H and h of the intake valves for the main and auxiliary combustion chambers, respectively. Curves $a$ and $b$ thus indicate variations of the lifts H and h of the main and auxiliary valves, respectively, in terms of the degrees of crankshaft rotation when the valves are open. As is seen in this graph, the auxiliary intake valve is operated to open and close after the main intake valve has been opened and closed, respectively, and yet both of the valves are kept open for an equal duration. It is also seen in FIG. 3 that the lift of the auxiliary intake valve becomes larger than the lift of the main intake valve toward the ends of the opening periods of the valves as indicated by a hatched area. As pointed out previously, the arrangement of the character above described is liable to sometimes invite reverse flow of the burned gases from the auxiliary combustion chamber past the auxiliary intake valve and into the auxiliary intake manifold.

In order to eliminate this and other drawbacks which have been inherent in the prior art internal combustion engines of the described type, it is herein proposed, with reference to FIG. 1, to have the intake valve 36 for the auxiliary combustion chamber 18 arranged to have a valve lift smaller than the lift of the intake valve 28 for the main combustion chamber 12 throughout the durations of opening of the two valves and to keep the auxiliary intake valve 36 open for a duration which is shorter than a duration of opening of the main intake valve for each intake stroke of the piston 20. In this instance, it is preferable that the duration of opening of the auxiliary intake valve 36 is not less than about 60 per cent of the duration of opening of the main intake valve 28 for each of the intake strokes of the engine. If, thus, the main intake valve 28 is to be kept open for a duration corresponding to about 240° of crankshaft rotation, then the auxiliary valve 36 should be kept open for a duration which corresponds to more than about 140° of crankshaft rotation. The capacity of the auxiliary chamber 18 may be preferably so selected that the ratio of the capacity of the auxiliary combustion chamber 18 vs. the clearance volume (previously defined) of the cylinder is in a range of from about 1:20 to about 1:5. In this instance, the main and auxiliary intake valves 28 and 36 may be preferably so arranged as to have maximum valve lifts of about 10 mm and about 2 to 5 mm.

The main intake valve 28 is operated to open, or more exactly start to open, at a suitable number of, preferably about 21° of crankshaft rotation before the top dead center on the exhaust stroke and to close, or more exactly, fully close, at a suitable number of, preferably about 48° to 60° of crankshaft rotation before the bottom dead center on the compression stroke. The main intake valve 28 may be operated to start to close at about 108° to 120° of crankshaft rotation on the intake stroke.

On the other hand, the auxiliary intake valve 36 is preferably so operated as to open, or more exactly start to open, after the main intake valve 28 has been opened and to close or, more exactly, fully close, before or at least simultaneously as the main intake valve 28 is fully closed. More preferably, the auxiliary intake valve 36 is operated to start to open in the vicinity of the top dead center on the exhaust stroke or when the lift of the main intake valve 28 is about 5 mm, viz., about half the maximum lift of the main intake valve 28. The auxiliary intake valve 36 is, furthermore, preferably so operated as to start to close at an instant when the valve lift thereof is about 2 to 5 mm. As previously noted, the auxiliary intake valve 36 is preferably fully closed before or simultaneously as the main intake valve 28 closes. In this instance, the time lag between the timings at which the main and auxiliary intake valves are fully closed is preferably in correspondence the crankshaft rotation through an angle of less than 60°.

FIG. 4 illustrates curves A and B which indicated preferred examples of the opening and closing timings as at points $P_o$, $P_c$, $Q_o$ and $Q_c$ and the variations of the valve lifts H and h of the main and intake valves, respectively, as proposed by the present invention. As indicated by curve A, the main intake valve having a maximum valve lift of 10 mm is operated in such a manner as to start to open at point Po, viz., 12° before the top dead center (TDC) on the exhaust stroke and to fully close at point Pc, viz., 48° past the bottom dead center (BDC) on the compression stroke. The main intake valve is thus kept open for a duration of T which in this instance corresponds to 240° of crankshaft rotation. On the other hand, the auxiliary intake valve has a maximum lift of 3 mm and is operated in such a manner as to start to open at point Qo, viz., 2° before the top dead center on the exhaust stroke and to close at point Qc, viz., 18° after the bottom dead center on the compression stroke. The duration t of opening of the auxiliary intake valve is accordingly in correspondence with 200° of crankshaft rotation which is 60 per cent of the degrees of crankshaft rotation. The time lag $\tau$ between the timings of the main and auxiliary intake valves being fully closed corresponds with 30° of crankshaft rotation.

Experiments have revealed that the escape of the air-fuel mixture from the auxiliary combustion chamber into the main combustion chamber can be practically completely precluded and accordingly the ratio between the volumes of the air-fuel mixtures in the main and auxiliary combustion chambers can be maintained constant under any operating conditions of the engine by virtue of the valve and valve actuating arrangement thus far described.

What is claimed is:

1. A reciprocating-piston, four-stroke spark-ignition internal combustion engine having main and auxiliary combustion chamber comprising main and auxiliary intake valves respectively associated with said main and auxiliary combustion chambers in each of engine cylinders, the auxiliary intake valve having a valve lift smaller than a valve lift of the main intake valve, the auxiliary intake valve being operated to open for a duration shorter than a duration of opening of the main intake valve, the auxiliay intake valve being operated to start to open after the main intake valve has been opened, and to fully close simultaneously as or before the main intake valve is fully closed and to fully close at a timing later than the bottom dead center of the engine on the compression stroke.

2. An internal combustion engine as set forth in claim 1 further comprising main and auxiliary carburetors respectively arranged to communicate through the main and auxiliary intake valves with said main and auxiliary combustion chambers, said main and auxiliary carburetors having respective throttle valves, and mechanical linkage means connecting between the throttle valves of said main and auxiliary carburetors for moving said main and auxiliary carburetors to deliver air-fuel mixtures which are proportioned in volume to a substantially fixed ratio.

3. A reciprocating-piston, four-stroke spark-ignition internal combustion engine having main and auxiliary combustion chambers, comprising main and auxiliary intake valves respectively associated with said main and auxiliary combustion chambers in each of engine cylinders, the auxiliary intake valve having a valve lift smaller than a valve lift of the main intake valve, the auxiliary intake valve being operated to open for a duration shorter than a duration of opening of the main intake valve, the auxiliary intake valve being operated to start to open after the main intake valve has been opened and, to fully close simultaneously as or before the main intake valve is fully closed and to fully close at a timing later than the bottom dead center of the engine on the compression stroke, the auxiliary intake valve being kept open for a duration which is more than about 60 per cent of a duration of opening of the main intake valve.

4. A reciprocating-piston, four-stroke spark-ignition internal combustion engine having main and auxiliary combustion chambers, comprising main and auxiliary intake valves respectively associated with said main and auxiliary combustion chambers in each of engine cylinders, the main intake valve being operated to start to open at a suitable number of degrees of crankshaft rotation before the top dead center on the exhaust stroke and to fully close a suitable number of degrees of crankshaft rotation after the bottom dead center of crankshaft rotation on the compression stroke, whereas the auxiliary intake valve has a valve lift smaller than a valve lift of the main intake valve, the auxiliary intake valve being operated to open for a duration shorter than a duration of opening of the main intake valve, the auxiliary intake valve being operated to start to open after the main intake valve has been open and to start to open in the vicinity of the top dead center on the exhaust stroke, and to fully close simultaneously as or before the main intake valve is fully closed and to fully close at a timing later than the bottom dead center of the engine on the compression stroke.

5. An internal combustion engine as set forth in claim 4, in which said auxiliary intake valve is kept open for a duration more than about 60 per cent of a duration of the main intake valve.

6. An internal combustion engine as set forth in claim 4, in which said auxiliary intake valve is operated to fully close prior to closing of the main intake valve with a time lag corresponding to less than 60° of crankshaft rotation.

7. An internal combustion engine as set forth in claim 4, in which said main intake valve is operated to start to open at about 12° of crankshaft rotation before the top dead center on the exhaust stroke.

8. An internal combustion engine as set forth in claim 7, in which said main intake valve is operated to fully close at about 48° to 60° of crankshaft rotation past the bottom dead center on the compression stroke.

9. An internal combustion engine as set forth in claim 4, in which said auxiliary combustion chamber has a capacity which is proportioned relative to the clearance volume of the cylinder to a ratio of 1:20 to 1:5 to the clearance volume.

10. An internal combustion engine as set forth in claim 9, in which said main intake valve has a maximum valve lift of about 10 mm.

11. An internal combustion engine as set forth in claim 10, in which said auxiliary intake valve has a maximum valve lift of about 2 to 5 mm.

12. An internal combustion engine as set forth in claim 11, in which said auxiliary intake valve is operated to start to open at an instant when said main intake valve is positioned to have a valve lift of about 5 mm.

* * * * *